Patented July 22, 1941

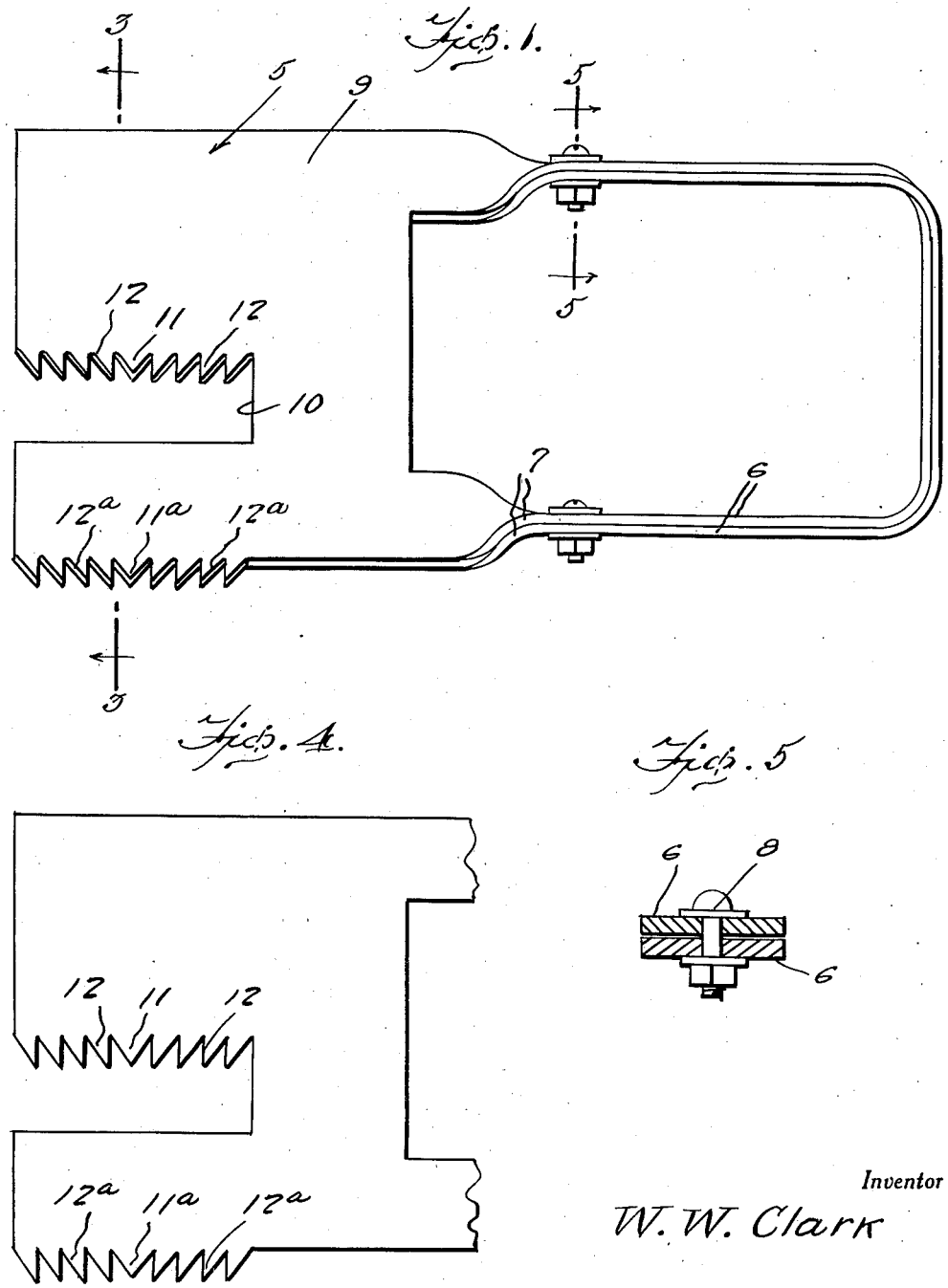

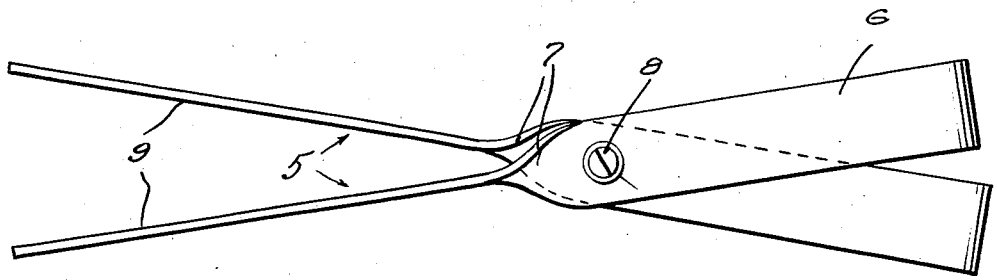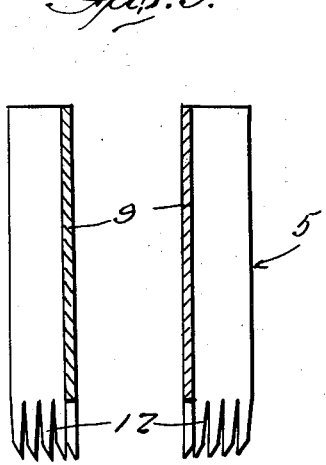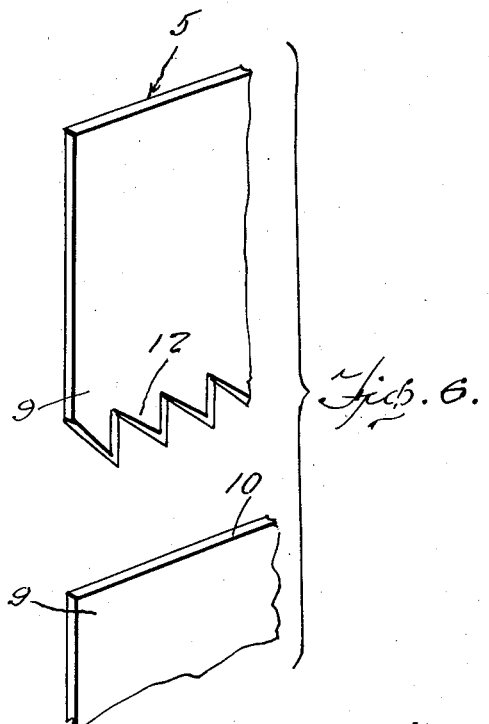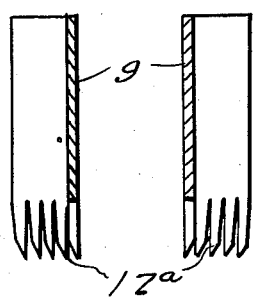

2,250,151

UNITED STATES PATENT OFFICE 2,250,151

CANE AND CORNSTALK STRIPPER

William W. Clark, Salisbury, N. C.

Application October 5, 1939, Serial No. 298,123

2 Claims. (Cl. 130—31)

This invention relates to new and useful improvements in implements for stripper cane and corn stalks for the purpose of providing fodder for cattle.

The principal object of the present invention is to provide a stripper which can be easily manipulated and which will shear off the appendages of cane and corn stalks in both a quick and convenient manner.

Another important object of the invention is to provide an implement which can be manufactured at low cost and which will be durable in use.

These and various other important objects and advantages of the invention will become apparent to the reader of the following specification.

In the drawings—

Figure 1 represents a side elevational view.

Figure 2 is a top plan view.

Figure 3 is a cross section on the line 3—3 of Figure 1.

Figure 4 is a fragmentary inside elevational view of one of the blades.

Figure 5 is a section on the line 5—5 of Figure 1.

Figure 6 is a fragmentary enlarged perspective view of one of the blades.

Referring to the drawings wherein like numerals designate like parts, it can be seen that the implement consists of the two blades generally referred to by numerals 5—5. These blades 5 and their handles are stamped from a sheet of metal. The handle 6 of each blade is of substantially U-shape and of narrow width. The handles 6 are twisted as at 7 so that the material of the handles will lie on substantially parallel planes and at right angles to the planes of the blades 5. The handles adjacent the twisted portions 7 are pivotally secured together as at 8, at both sides of the implement to thus pivotally connect the handles together to permit operation of the blades 5 when the handles are manipulated.

Each of the blades 5 consists of a plate 9 having an inwardly cut portion 10, the lower edge of which is straight while the upper edge is formed with teeth. These teeth consist of the intermediate V-shaped tooth 11 and the teeth 12 extending laterally therefrom, the latter teeth having their edges adjacent or on their sides toward the tooth 11 in parallel relation with the axis of the tooth 11 while their distal or far edges are slanted. The slanted edges of the teeth 12 beside both edges of the tooth 11 are beveled to cutting edges on the outer sides of the blades 5 as suggested in Figures 1 and 4.

The lower edge of the plate 9 is also provided with an arrangement of teeth 11a and 12a corresponding to the formation of teeth 11 and 12 provided at the upper edge of the cut away portion 10.

It can be seen that the handles can be opened so as to expand the blades. The implement can then be applied to a cane or stalk of corn and by a downwardly sweeping action once or twice, all the leaves of the stalks will be conveniently sheared off.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A stripper comprising a pair of U-shaped handles arranged in crossed relation with their leg portions pivotally connected together, a plate-like extension bridging the leg portions of each handle structure, each of the plates having an edge portion formed with teeth.

2. A stripper comprising a pair of U-shaped handles arranged in crossed relation with their leg portions pivotally connected together, a plate-like extension bridging the leg portions of each handle structure, each plate being formed with an inwardly extending cut-out portion with one edge portion of the plate at said cut-out portion being provided with teeth.

WILLIAM W. CLARK.